UNITED STATES PATENT OFFICE.

EDWARD L. CONWELL, OF UPLAND, PENNSYLVANIA, ASSIGNOR TO ALUMINATE PATENTS COMPANY, OF PHILADELPHIA, PENNSYLVANIA, A CORPORATION OF NEW JERSEY.

CEMENTITIOUS MATERIAL.

1,185,774.

Specification of Letters Patent.

Patented June 6, 1916.

No Drawing.   Application filed November 7, 1912.   Serial No. 729,989.

*To all whom it may concern:*

Be it known that I, EDWARD L. CONWELL, a citizen of the United States, and resident of Upland, Chester, Delaware county, Pennsylvania, have made a certain new and useful Invention Relating to Cementitious Materials, of which the following is a specification.

This invention relates to cementitious materials and processes of making the same from cementitious materials comprising lime, calcium aluminate or other suitable coöperating or strength accelerating material and supersulfate or other available energizing material, such as alkali metal supersulfates or bisulfates.

The invention relates especially to plaster compositions of this character comprising large proportions of lime and fused slow setting calcium aluminate or other strength accelerating material with which is incorporated sodium disulfate energizing material or the like, and to the processes of making such cementitious materials as by preferably grinding together or otherwise intimately incorporating calcium aluminate strength accelerating material and the supersulfate energizing material and mixing the same with the coöperating cementitious material comprising lime. Suitable energizing material of this class, that is, compounds apparently having loosely combined or otherwise available sulfuric acid or sulfuric anhydrid and which are herein referred to as supersulfates, such for example, as potassium disulfate ($K_2S_2O_7$) or its more hydrous variant potassium bisulfate ($KHSO_4$), sodium disulfate ($Na_2S_2O_7$), the related sodium bisulfate ($NaHSO_4$), ammonium bisulfate ($NH_4HSO_4$), ferric sulfate ($Fe_2(SO_4)_3$), and acid calcium sulfate, preferably in their commercial or crude forms, such as niter cake, acid calcium sulfate sludge, and so forth, seem to have desirable energizing action on fused slow setting calcium aluminate and other aluminous and silicious strength accelerating material when incorporated therewith, so as to increase and hasten the strength accelerating and cementitious action of such material on coöperating cementitious material comprising hydrated or otherwise available lime. This seems to be due to the supersulfate energizing material acting upon and disintegrating or opening up the strength accelerating material, possibly because of its available loosely combined sulfuric acid, either with or without water united therewith, thus apparently promoting the activity of certain hydraulic elements and their solubility in alkaline solutions of the material present, or rendering them more active in connection with the lime component of the coöperating cementitious material. Such supersulfate energizing material when incorporated to the extent of a few per cent. more or less, for example, with wall plaster compositions comprising about 85 parts of hydrated lime and 15 parts or so of fused slow setting calcium aluminate material containing considerable silica which is preferably water granulated or quickly cooled, materially promotes the cementitious properties and hydraulic set thereof and makes the compositions more desirable for use, especially under extreme service, where for example conditions tend to promote excessive drying out. Many such coöperating energizing materials containing similarly available loosely combined sulfuric anhydrid or sulfuric acid not only increase the cementitious properties and early strengths of the lime and aluminate or other calcareous mixtures, but also promote their plasticity, reliability and spreading properties and their hardening and substantially uniform, homogeneous setting. It is desirable that the fused calcium aluminate or other strength accelerating material and the sodium disulfate or other energizing material containing available acid should be ground together or otherwise thoroughly incorporated, which seems to promote the initiation of chemical action to the extent permitted by the presence of the usual small proportion of water therein, and the opening up or disintegration of the strength accelerating material. The strength accelerating action occurring when the plaster compositions or other calcareous cementitious materials in which such prepared materials are incorporated, are gaged and tempered, is possibly increased because of the further chemical interaction of the acid and other components and the decomposition or liberation of the aluminous, silicious or other hydraulic components in such form as to more readily exert cementitious or hydraulic action in connection with the lime and so forth. Besides securing an extremely intimate and desirable incorporation of the calcium aluminate or the like and any suitable coöperating energizing material containing loosely combined or available sulfuric anhydrid, this method of incorporation by grinding these components together, in ball and tube mills, for instance, also produces desirable combined strength accelerating materials which may be produced and shipped in the dry finely divided condition suitable for mixture in desired proportions with hydrated lime or other coöperating calcareous cementitious material. Hydrated lime plaster compositions prepared in this way by the incorporation of ten to twenty per cent. or so of fused slow setting calcium aluminate strength accelerating material and about one-thirtieth to one-sixth as much coöperating sodium disulfate energizing material, are extremely satisfactory from the practical working standpoint, and possess many of the desirable features of ordinary lump lime putty plasters including plasticity, ease of working and large sand carrying properties, besides being much more convenient to prepare for use, quicker hardening and having greater early strengths and cementitious or hydraulic properties and being more durable and resistant to freezing and other weather conditions. Such supersulfate energizing material may be advantageously mixed or incorporated in any desired way, preferably by grinding or otherwise intimately mixing, with various cementitious materials comprising free or available lime, such for example, as with hydrated lime or other high lime plaster compositions, that is compositions used for wall plastering and the like and also in some cases useful as mortars for brick laying and so forth, or with pozzuolanic or other cements in connection with any calcium aluminate or earthy alkali strength accelerating compounds of alumina-like material such as are referred to in the Spackman-Lazell Patents 903,017, 903,018, 903,019 and 903,020 of November 3, 1908, and 1,029,953 and 1,029,954, of June 18, 1912, on which this invention is based. It is of course understood that, as indicated in said patents, iron or similar material may be used in some cases to replace to some extent at least the alumina in this accelerating material, and that other earthy alkali material, such as magnesia and so forth, may be substituted for part at least of the lime combined therewith, such calcium aluminates and equivalent or substitute accelerating material being designated hydraulic earthy alkali accelerating compounds of alumina-like material. In the case of hydrated lime plaster compositions the lime and strength accelerating and energizing materials may with advantage be crushed together or intimately incorporated and the compositions simultaneously densified as described at length and claimed in the application of Spackman and Lazell, Serial No. 698,906, filed May 22, 1912. Various supersulfate energizing materials may also be used with relatively large proportions of fused or other calcium aluminate material or the like, incorporated with relatively small proportions of lime and also with additional siliceous material if desired, so as to form high strength cementitious compositions containing large proportions of calcium aluminate material. Relatively small proportions of such supersulfate energizing material considerably increase the early strengths and improve the plasticity, reliability and other properties of calcium aluminate hydrated lime plaster compositions, for example, and for this purpose the energizing material may be incorporated in varying proportions from a small fraction of a per cent. of sodium bisulfate, for instance, which produces material energizing action, to several per cent. or more. For general purposes good results are secured when sufficient sodium disulfate is incorporated with fused low lime calcium aluminate material containing considerable silica so that free or available sulfuric acid is thus provided to the extent of .3% to .5% or so of the total hydrated lime plaster composition containing 12% to 20% more or less of the calcium aluminate material.

An illustrative plaster composition may comprise 85 parts of hydrated dolomitic lime and 15 parts of composite strength accelerating material formed by grinding together one part of sodium disulfate with eight parts of calcium aluminate material, the components having about the compositions indicated in the following table. This plaster material when tested with four parts of Ottawa sand in the same way as cement compositions gave the following tensile strengths per square inch: at 24 hours 34 pounds; at 2 days 53 pounds; at 3 days 73 pounds; at 7 days 90 pounds; at 28 days 90 pounds and at 3 months 105 pounds.

| | Hydrated dolomitic lime. | Calcium aluminate. | Sodium disulfate. |
|---|---|---|---|
| Silica (SiO₂) | 2.04 | 21.62% | 1.5% |
| Ferric oxid and alumina (R₂O₃) | 0.61 | 27.88 | 0.2 |
| | | 27.34 | |
| Lime (CaO) | 30.86 | 8.39 | |
| Magnesia (MgO) | 3.32 | | |
| Calcium carbonate (CaCO₃) | 61.58 | | |
| Calcium hydrate (Ca(OH)₂) | | | |
| Sodium sulfate (Na₂SO₄) | | | 62.8 |
| Sulfuric anhydrid (SO₃) | | | 30.1 |
| Mechanically contained water | 0.21 | | 5.3 |
| Water (H₂O) | 0.46 | | |
| Loss on ignition | | | |

Another plaster composition containing a larger proportion of similar composite accelerating material was prepared by intimately incorporating 75 parts of similar dolomitic hydrated lime with 25 parts of supersulfate calcium aluminate strength accelerating material and when similarly tested gave the following tensile strengths: at 24 hours 53 pounds; at 2 days 65 pounds; at 3 days 104 pounds; at 7 days 105 pounds; at 28 days 120 pounds; at 3 months 130 pounds; at 6 months 175 pounds. An illustrative plaster composition was formed by intimately incorporating similar hydrated dolomitic lime with combined strength accelerating material formed by grinding together 8 parts of similar fused low lime calcium aluminate strength accelerating material and one part of acid calcium sulfate sludge, this material when similarly tested giving the following tensile strengths: at 24 hours 40 pounds; at 2 days 53 pounds; at 7 days 62 pounds; at 28 days 66 pounds; at 3 months 68 pounds.

Another illustrative composition suitable for plastering purposes was formed by intimately incorporating 85 parts of similar hydrated dolomitic lime with 15 parts of combined accelerating material formed by grinding together 1 part of sodium disulfate with 8 parts of fused calcium aluminate strength accelerating material having approximately the composition shown in the following analysis. This plaster material when similarly tested gave the following tensile strengths per square inch: at 24 hours 11 pounds; at 2 days 25 pounds; at 7 days 41 pounds; at 28 days 45 pounds; at 3 months 56 pounds.

Silica (SiO$_2$) _____ 27.96
Ferric oxid and alumina (R$_2$O$_3$) ____ 20.60
Lime (CaO) _____ 34.47
Magnesia (MgO) _____ 14.96
Loss on ignition _____ 1.93

Another illustrative plaster composition was formed by thoroughly incorporating 85 parts of hydrated high calcium lime with combined strength accelerating material formed by grinding together 8 parts of fused low lime calcium aluminate with 1 part of sodium disulfate. This material when tested under cement conditions with 3 parts of standard Ottawa sand gave the following tensile strengths per square inch: at 24 hours 30 pounds; at 2 days 52 pounds; at 7 days 68 pounds; at 28 days 72 pounds; at 3 months 74 pounds.

Another illustrative plaster composition was formed by thoroughly incorporating 85 parts of hydrated high calcium lime having about the composition shown in the following table, with 15 parts of combined accelerating material formed by grinding together 1 part of sodium disulfate with 8 parts of calcium aluminate made by calcining together bauxite and limestone so that this calcium aluminate had substantially the composition shown in the following analysis. This composition when similarly tested gave the following tensile strengths: at 24 hours 82 pounds; at 2 days 85 pounds; at 7 days 77 pounds; and at 28 days 105 pounds.

|  | Calcium aluminate | High calcium hydrated lime |
|---|---|---|
| Silica (SiO$_2$) | 7.64 | 1.96 |
| Ferric oxid and alumina (R$_2$O$_3$) | 48.52 | .96 |
| Lime (CaO) | 38.36 | 71.38 |
| Magnesia (MgO) | 1.21 | 1.41 |
| Sulfuric anhydrid (SO$_3$) | .97 | |
| Loss on ignition | 3.04 | 24.23 |

Another illustrative plaster or mortar composition was made by mixing together 83 parts of high calcium hydrated lime having the following composition, 15 parts of similar fused calcium aluminate strength accelerating material and two parts of practically pure potassium disulfate comprising about 66 parts of potassium sulfate and 34 parts of sulfuric anhydrid. The ingredients for this plaster composition were separately ground before being mixed or mechanically incorporated, and the composition when tested after being mixed with four parts by weight of Philadelphia bar sand gave the following tensile strengths: at 24 hours 40 pounds; at 2 days 59 pounds; at 7 days 100 pounds; and at 28 days 105 pounds.

The following results were secured by the use of such supersulfate energizing material with an illustrative high strength calcium aluminate cement containing small proportions of hydrated lime so as to make a strong cement suitable for various purposes. This cementitious composition containing 83 parts of such fused calcium aluminate material, 15 parts of hydrated lime and 2 parts of sodium disulfate gave when 1 part of the cement was tested in water with 3 parts of Ottawa sand: at 24 hours 200 pounds, at 3 days 327 pounds, at 7 days 360 pounds and at 28 days 370 pounds tensile strength per square inch.

Such energizing materials as supersulfate or other material comprising free or available acid may be used in this way, not only with calcium aluminate accelerating material, but also with many other strength accelerating or hardening materials containing alumina and silica, such, for instance, as trass, tufa, raw or calcined clay, shale, or other natural, prepared or artificial pozzuolanic material, and with natural or Portland cements, bauxites, kaolins or other high aluminous material on which they seem to exert an energizing action of possibly different character. While such compositions are not usually nearly as good as the calcium aluminate compositions, yet in many cases especially if larger proportions of the combined strength accelerating materials are used they can be practically employed for plastering purposes and have much greater plasticity, workability and ultimate strength than ordinary hydrated lime plasters.

A plaster composition was made by incorporating with dolomitic hydrated lime 15% of the composite strength accelerating material comprising natural cement ground together with one-eighth as much sodium disulfate which produces a composition having good workability and spreading properties and desirable hardening and early strengths so as to be much superior to a corresponding mixture of the natural cement and lime without the incorporation of the supersulfate energizing material. This composition when one part was tested with four parts of Ottawa sand gave the following tensile strengths per square inch: at 24 hours 7 pounds; at 2 days 22 pounds; at 7 days 27 pounds; at 28 days 32 pounds; at 3 months 62 pounds; the magnesian hydrated lime, the combined strength accelerating material comprising natural cement and sodium disulfate, and the sodium disulfate energizing material used in the foregoing composition having about the following analyses:

|  | Magnesian hydrated lime. | Natural cement: Combined strength accelerating material comprising 8 parts natural cement and 1 part sodium disulfate. | Sodium disulfate. |
|---|---|---|---|
| Silica (SiO$_2$) | 2.04% | 26.92% | 1.3% |
| Ferric oxid and alumina (R$_2$O$_3$) | 0.64 | 10.81 | 0.2 |
| Lime (CaO) |  | 14.35 |  |
| Magnesia (MgO) | 30.86 | 2.84 |  |
| Calcium carbonate (CaCO$_3$) | 3.32 |  |  |
| Calcium hydrate (Ca(OH)$_2$) | 61.58 |  |  |
| Sodium sulfate (Na$_2$SO$_4$) |  |  | 62.8 |
| Sulfuric anhydrid (SO$_3$) |  | 7.40 | 30.4 |
| Mechanically contained water | 0.24 |  |  |
| Water (H$_2$O) |  |  | 5.2 |
| Loss on ignition |  | 5.16 |  |

Another suitable plaster composition was produced by thoroughly incorporating with hydrated high calcium lime 15% of the composite strength accelerating material comprising natural cement and one-eighth as much of sodium disulfate which had been ground together with the natural cement so as to be thoroughly incorporated. This plaster composition gave when similarly tested the following tensile strengths: at 24 hours 30 pounds; at 2 days 56 pounds; at 7 days 62 pounds; at 28 days 82 pounds, this natural cement being designated No. 1 in the following table. Another suitable plaster composition which had somewhat less satisfactory hardening properties when used as a wall plaster was made by similarly incorporating with the same high calcium hydrated lime 15% of similar composite strength accelerating material formed by grinding together 1 part of sodium disulfate with 8 quarts of another natural cement designated No. 2 in the following table. This plaster composition when similarly tested gave the following tensile strengths: at 24 hours 10 pounds; at 2 days 35 pounds; at 7 days 43 pounds and at 28 days 58 pounds.

|  | Natural cement #1. | Natural cement #2. |
|---|---|---|
| Silica (SiO$_2$) | 20.22% | 23.68% |
| Ferric oxid and alumina (R$_2$O$_3$) | 8.22% | 16.96% |
| Lime (CaO) | 44.76% | 34.95% |
| Magnesia (MgO) | 10.01% | 14.90% |
| Sulfuric anhydrid (SO$_3$) | 1.95% | 1.04% |
| Loss on ignition | 13.88% | 9.60% |

An illustrative plaster composition formed by intimately incorporating 85 parts of hydrated high calcium lime and 15 parts of strength accelerating material containing 1 part sodium disulfate and 8 parts of fused strength accelerating material containing alumina and silica and having approximately the composition shown by the following analysis gave when similarly tested the following tensile strengths: at 24 hours 12 pounds, at 2 days 37 pounds, at 7 days 55 pounds; at 28 days 57 pounds and at 3 months 68 pounds.

Silica (SiO$_2$) _____ 31.80
Ferric oxid and alumina (R$_2$O$_3$) _____ 15.68
Lime (CaO) _____ 47.13
Magnesia (MgO) _____ 2.22
Loss on ignition _____ .84

Another illustrative plaster composition of somewhat less strength was made by incorporating with hydrated dolomitic lime 15 per cent. of combined strength accelerating material having substantially the composition shown in the following analysis and formed by grinding together one part of sodium disulfate with eight parts of roasted clay. This plastic material when tested in the usual way showed 28 pounds tensile strength per square inch at 7 days and 41 pounds at 28 days.

Silica (SiO$_2$) _____ 66.92
Ferric oxid and alumina (R$_2$O$_3$) _____ 17.26
Lime (CaO) _____ .79
Magnesia (MgO) _____ Trace.
Sulfuric anhydrid (SO$_3$) _____ 6.82
Loss on ignition _____ 7.28

It is of course understood that the strength tests given in connection with the foregoing examples must be considered in connection with the extreme difficulty of securing reliable strength tests with lime plaster compositions. These tensile tests were made on briquets formed in the regular way for cement testing, the briquets being kept in air, but in spite of all possible precautions considerable variations are likely to be found in such results and it is well understood that much more reliance must be placed on the practical working results of such plaster compositions in which way their plasticity, sand carrying qualities, workability and hardening, setting, strength and reliability can be determined in a more satisfactory way, especially since high tensile strengths are not of first importance in ordinary plastering compositions provided the material develops at a relatively early period sufficient strength to certainly remain in position, on the wall in spite of such disturbance or vibration as may be occasioned by setting the adjacent door frames or trim.

The invention has been described in this case which contains subject-matter taken from the copending Cornwell application, Serial No. 648,267, filed September 8, 1911, in connection with a number of illustrative compositions, ingredients, proportions, formulas and methods of preparation and use, to the details of which disclosure the invention is not of course to be limited, but—

What is claimed as new and what is desired to be secured by Letters Patent is set forth in the appended claims.

1. The plaster composition comprising a large proportion of hydrated high calcium lime mixed with ten to twenty per cent. of fused calcium aluminate strength accelerating material comprising considerable silica which has been ground together with about one-eighth as much sodium disulfate energizing material.

2. The plaster composition comprising a large proportion of hydrated lime mixed with fused calcium aluminate strength accelerating material comprising considerable silica which has been ground together with supersulfate energizing material.

3. The plaster composition comprising a large proportion of hydrated lime mixed with calcium aluminate strength accelerating material and coöperating alkali metal supersulfate energizing material.

4. The plaster composition comprising a large proportion of hydrated lime mixed with calcium aluminate strength accelerating material and coöperating supersulfate energizing material.

5. The plastic composition comprising a considerable proportion of hydrated lime mixed with calcium aluminate strength accelerating material comprising considerable silica and coöperating supersulfate energizing material.

6. The cementitious material comprising a considerable proportion of available lime mixed with calcium aluminate strength accelerating material which has been ground together with about one-eighth as much sodium disulfate energizing material.

7. The cementitious material comprising a considerable proportion of available lime mixed with strength accelerating compounds rich in alumina-like material and coöperating supersulfate energizing material.

8. The cementitious material comprising a considerable proportion of available lime mixed with strength accelerating compounds rich in alumina-like material and sodium disulfate.

9. The cementitious material comprising a considerable proportion of available lime mixed with aluminous strength accelerating material and coöperating energizing material comprising available sulfuric anhydrid loosely held in combination.

10. The cementitious material comprising a large proportion of hydrated lime mixed with strength accelerating compounds rich in alumina-like material and between about five to fifteen per cent. as much coöperating energizing material comprising available sulfuric anhydrid.

11. The cementitious material comprising a large proportion of hydrated lime mixed with between about ten to twenty per cent. of strength accelerating compounds rich in alumina-like material and between about five to fifteen per cent. as much coöperating supersulfate energizing material.

12. The plaster composition comprising a large proportion of hydrated lime mixed with strength accelerating compounds rich in alumina-like material and coöperating alkali metal supersulfate energizing material.

13. The plaster composition comprising a large proportion of available lime mixed with strength accelerating compounds rich in alumina-like material which have been ground together with between about five to fifteen per cent. as much coöperating alkali metal supersulfate energizing material.

14. The cementitious material comprising a considerable proportion of available lime mixed with between about ten to twenty per cent. of strength accelerating compounds rich in alumina-like material and between about five to fifteen per cent. as much alkali metal supersulfate energizing material.

15. The cementitious material comprising a considerable proportion of available lime mixed with calcium aluminate strength accelerating material and coöperating energizing material comprising available sulfuric anhydrid.

16. The cementitious material comprising a considerable proportion of available lime mixed with calcium aluminate strength accelerating material containing considerable silica which has been ground together with from five to fifteen per cent. as much coöperating supersulfate energizing material.

17. The cementitious material comprising a considerable proportion of available lime mixed with strength-accelerating material composed of considerable alumina and silica and coöperating alkali metal supersulfate energizing material.

18. The cementitious material comprising a considerable proportion of available lime mixed with strength accelerating material therefor comprising alumina and silica and coöperating energizing material comprising available sulfuric anhydrid loosely held in combination.

19. The substantially dry finely divided plastic composition comprising a large proportion of hydrated lime mixed with aluminous strength accelerating material and between about five to fifteen per cent. as much coöperating energizing alkali metal supersulfate energizing material.

20. The substantially dry finely divided plastic compositions comprising a large proportion of hydrated lime mixed with fused calcium aluminate strength accelerating material combined with about one-eighth as much sodium disulfate energizing material.

21. The substantially dry finely divided plastic composition comprising a large proportion of available lime mixed with aluminous strength accelerating material with which has been incorporated sodium disulfate energizing material.

EDWARD L. CONWELL.

Witnesses:
   BENJAMIN H. LUDLOW,
   WILLIAM H. CREAMER, Jr.